United States Patent
Panczyk et al.

(10) Patent No.: US 6,890,462 B2
(45) Date of Patent: May 10, 2005

(54) FOAM LAMINATE FOR MOLD IN PLACE SEATING COMPONENT

(75) Inventors: Michael H. Panczyk, Dearborn, MI (US); Andrew M. Thompson, West Chester, PA (US); Richard C. Meyer, Novi, MI (US); Paul Haslanger, Swarthmore, PA (US)

(73) Assignee: Foamex L.P., Linwood, PA (US)

( * ) Notice: Subject to any disclaimer, the term of this patent is extended or adjusted under 35 U.S.C. 154(b) by 305 days.

(21) Appl. No.: 10/164,352

(22) Filed: Jun. 6, 2002

(65) Prior Publication Data

US 2003/0228455 A1 Dec. 11, 2003

(51) Int. Cl.$^7$ ............................................. B29C 44/06
(52) U.S. Cl. ................... 264/46.8; 264/46.4; 264/46.6; 264/321
(58) Field of Search ............... 264/46.4, 46.6, 264/46.8

(56) References Cited

U.S. PATENT DOCUMENTS

| | | | |
|---|---|---|---|
| 3,929,948 A | * 12/1975 | Welch et al. | ............... 264/45.5 |
| 4,138,283 A | 2/1979 | Hanusa | |
| 4,247,347 A | 1/1981 | Lischer et al. | |
| 4,923,653 A | * 5/1990 | Matsuura et al. | ......... 264/46.6 |
| 4,959,184 A | * 9/1990 | Akai et al. | ................. 264/40.3 |
| 4,976,414 A | * 12/1990 | Yanagishita | ................. 264/40.3 |
| 5,053,271 A | 10/1991 | Mori et al. | |
| 5,242,587 A | 9/1993 | Barrington et al. | |
| 5,294,386 A | 3/1994 | Roth et al. | |
| 5,468,434 A | * 11/1995 | Powell et al. | ............... 264/46.8 |
| 5,582,789 A | 12/1996 | Stein et al. | |
| 5,611,977 A | * 3/1997 | Takei | ........................ 264/46.5 |
| 5,614,301 A | 3/1997 | Katz | |

FOREIGN PATENT DOCUMENTS

| | | |
|---|---|---|
| EP | 0 822 116 A2 | 2/1998 |
| FR | 2 249 763 | 5/1975 |
| GB | 1418235 | 12/1975 |

\* cited by examiner

*Primary Examiner*—Allan R. Kuhns
(74) *Attorney, Agent, or Firm*—Connolly Bove Lodge & Hutz LLP

(57) ABSTRACT

A laminate structure for making a cushioned component for a vehicle interior, such as a seat cushion or head rest, has a high density foam bonded to an interior surface of a seat cover material. After the laminate structure is formed into a desired shape for the cushioned component, it is inserted into a vacuum mold having a mold surface with a shape corresponding with a desired exterior surface shape of the cushioned component. Liquid foam-forming material is injected into the laminate structure within the mold and allowed to cure to form the cushioned component. The high density foam of the laminate structure preferably has a density of at least 4 lbs/ft$^3$ and an air permeability of 5 to 100 ft$^3$/ft$^2$ minute. This high density foam may be created by felting a polyurethane foam.

13 Claims, 1 Drawing Sheet

FOAM LAMINATE FOR MOLD IN PLACE SEATING COMPONENT

This invention relates to covers for mold in place seating components used in the construction of vehicle seating, and more particularly to fabric-foam laminates forming such covers, which covers are placed within a contoured mold and filled with a foaming material that cures within the mold to adopt the final cushion shape of the seating component.

BACKGROUND OF THE INVENTION

Most vehicle seats comprise a rigid frame assembly that includes a seat cushion section and a seat back section. Frequently, the seat cushion section supports a seat cushion formed of cushioning foamed material. A cover assembly is provided that includes a seat cushion panel that engages the foamed material of the seat cushion and a skirt extending from the periphery of the cover panel so as to cover the frame. For a seat back, the foam material is positioned on the front side of the frame and the cover assembly is formed as a bag that includes a front panel having an interior surface that engages the forward surface of the foam material and an exterior surface which is engaged by the back of the occupant when seated in the vehicle. A rear panel usually is provided that extends around and over the back of the frame.

The cushioning foam material within the cover assembly may be foamed in place. The cover is retained in its final desired contoured shape in the interior space within a mold. A shot of liquid foam-forming ingredients is injected into the cover while in the mold. The foam is allowed to cure while held in the mold so as to adopt the shape of the mold interior. Once the foam is cured, the final seating component or seat cushion assembly is removed from the mold.

If a vacuum mold is used, vacuum molding of the cover panel for seating components requires that the cover be made of a material that includes an impermeable layer. Most commonly, a thin layer of foam is laminated to the back surface of the fabric cover panel. In turn, an imperforate layer, such as a 2 mil thick layer of polyurethane film, is bonded or adhered to the thin foam layer. Thus, the thin foam layer is sandwiched between the rear surface of the fabric cover panel and the thin imperforate film layer.

The cover panel that is to receive the liquid foam-forming material during the foam in place molding most often is sewn together to create the seating component shape. The sewing frequently is performed at a different location from the molding operation. When sewing, it is possible for the imperforate film to be punctured. The film may also be weakened or punctured during transport. Any holes or cracks in the imperforate film allow liquid foam forming material to penetrate or seep through the imperforate film and contact the cover panel. Upon curing, the material forms hard spots in the cover. Hard spots are considered defects that may cause the cover panel to be rejected. In severe cases, foam even may strike through to the outer surface of the fabric, thus causing an unacceptable visual appearance.

Applying the imperforate film to the foam-cover panel laminate represents a further manufacturing step—adding time and expense to the seating component manufacture. In addition, the sewn seams of the cover panel necessarily puncture the imperforate film and may need to be covered with a tape or film, which is yet another processing step.

As one suggested solution, U.S. Pat. No. 5,468,434 proposes sewing the thin foam layer-fabric cover panel into the form of the desired seating component, then placing the imperforate film adjacent to the foam layer just before closing the mold for the foam in place operation, and heating the film to cure and bond it to the foam layer. Thereafter, the liquid foam forming material is introduced into the mold.

As another proposal, U.S. Pat. No. 4,959,184 suggests that penetration through the fabric panel can be prevented by predetermined careful control of the pressure within the mold cavity during the foam in place operation.

The industry thus continues to seek an economical solution to the bleed through/strike through problems encountered with foam in place seating component molding.

SUMMARY OF THE INVENTION

The invention is a laminate structure for making a cushioned seat component particularly useful for foam in place molding of automotive seating components, although such laminate may also be useful for fabricating trim or other interior components in motor vehicle passenger compartments. A high density foam, which has a density of at least 4 lbs/ft$^3$, preferably from 4 to 12 lbs/ft$^3$ and most preferably from 5 to 10 lbs/ft$^3$, and which has an air permeability of from 5 to 100 ft$^3$/ft$^2$ minute, preferably 5 to 65 ft$^3$/ft$^2$ minute, most preferably 5 to 50 ft$^3$/ft$^2$ minute, is bonded to the interior surface of a cover material, such as an upholstery fabric or vinyl or combination of such materials, to form the laminate structure. The high density foam preferably has a 25% CFD in the range of 1.0 to 8.0 psi, more preferably 1.5 to 8.0 psi, most preferably 2.0 to 6.0 psi. Preferably, the high density foam is a polyurethane foam. A particularly preferred high density foam is a felted polyurethane foam.

This laminate structure is insertable into a mold, which can be but is not required to be a vacuum mold, having a mold surface with a shape corresponding with a desired exterior surface shape of at least a portion of the cushioned seat component or interior vehicle component. Representative seat components are seat backs, seat cushions, head rests and arm rests. The laminate structure is inserted into the mold so that the exterior surface of the cover material is positioned adjacent to the mold surface. Most often, the cover material is an upholstery fabric that is perforate between the interior and exterior surfaces thereof.

A second aspect of the invention is a method of making a cushioned component. The known foam in place method for making a cushioned component includes the steps of (a) providing a cover having an exterior surface which is to present the major exterior appearance of the cushioned component; (b) placing the cover within a mold so that the exterior surface of the cover is facing a mold surface of the mold having a shape corresponding with the desired exterior surface shape of the cushioned component; (c) introducing a foamable material into the mold while the cover is within the mold; and (d) curing the foamable material as said cover is held within the mold. The improvement according to this aspect of the invention comprises: (e) laminating a high density foam sheet to the interior surface of the material forming the cover prior to placing the cover into the mold. The cover material may be an upholstery fabric or vinyl, or a combination or leather.

The molding process may also include the step of: (f) applying a vacuum to the mold so as to draw the exterior surface of the cover into conformity with the mold surface of the mold having said shape corresponding to the desired exterior surface shape of the cover so that said cover is brought generally into conformity with its desired shape. With such step (f) it is preferable to have a cover that is formed from a material that is perforate between the interior and exterior surfaces thereof.

The high density foam sheet has an air permeability of from 5 to 100 ft$^3$/ft$^2$ minute, preferably from 5 to 50 ft$^3$/ft$^2$ minute, and a density of at least 4 lbs/ft$^3$, preferably from 4 lbs/ft$^3$ to 15 lbs/ft$^3$, most preferably from 5 to 10 lbs/ft$^3$. The high density foam also preferably has an 25% CFD in the range of 1.0 to 8.0 psi, more preferably 1.5 to 8.0 psi, most preferably 2.0 to 6.0 psi.

The high density foam may be a polyurethane foam. A particularly preferred high density foam is created by felting a polyurethane foam.

The cushioned components frequently molded in such process include seat backs, seat cushions, head rests and arm rests. It would also be possible to adapt this molding process for use with interior trim components for motor vehicle passenger compartments.

DESCRIPTION OF THE FIGURES

The invention will be more fully understood by referring to the detailed specification and claims taken in connection with the following drawings.

DESCRIPTION OF THE PREFERRED EMBODIMENTS

Figure 1:
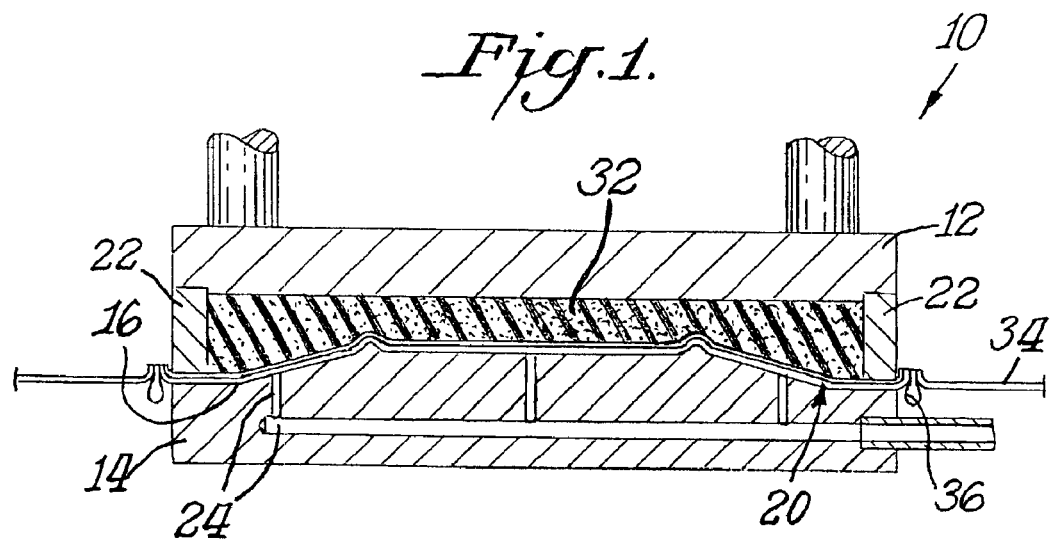
FIG. 1 is an enlarged sectional view of a mold assembly used in making a seat cushion component.

Referring first to FIG. 1, a mold assembly 10 is used to mold a foam cushion 32 onto a cover material 20 to form a vehicle seat. A vehicle seat back is formed in a differently shaped mold assembly, but the same principles apply equally to each type of mold assembly. The variations in processing relate to the particular configuration of the seat cover and cushion.

The seat cover 20 includes a main seat panel and a skirt 34 which is sewn to the periphery of the seat panel by a seam including a welting strip 36. The cover 20 is a laminate formed from a high density foam sheet 26 laminated to an upholstery fabric sheet 28.

As shown in FIG. 1, the mold assembly 10 includes both an upper vacuum mold part 12 and a lower vacuum mold part 14, with a peripheral mold part 22. The lower mold part 14 includes vacuum openings 24 which convert the mold part into a vacuum mold 10.

The vacuum mold 10 includes a mold surface 16, which is shaped to define the configuration of the upper exterior surface of the seat panel. The cover 20 is inserted into the mold onto the mold surface 16. The exterior surface of the fabric material 28 is placed in contact with the mold surface 16 and the high density foam layer is directed toward the mold interior.

The peripheral mold part 22 is pivoted to engage the cover 20 along the periphery of the seat cover panel. The upper mold part 12 is brought into contact with the peripheral mold part 22 to close the mold. Thereafter, a vacuum is drawn within the mold to conform the shape of the cover 20 to the contour of the mold surface 16. Foamable expandable cushioning material, such as a mixture of polyurethane foam forming ingredients, is introduced into the mold cavity and onto the upwardly facing interior surface of the seat panel 20. As the foamable cushioning material is allowed to expand and cure while held within the mold cavity, it adopts the desired vehicle seat cushion contoured shape. After the foamable cushioning material has cured, the cover with the cushioning material thereon is removed from the mold assembly and mounted on the seat cushion frame.

The molding process can be varied. For example, it is not always required to draw a vacuum within the mold to conform the shape of the cover 20 to the contour of the mold surface 16. Some upholstery materials can be overly distorted when tension forces are applied due to such a vacuum. In addition, the foamable cushioning material may be introduced into a portion of the mold cavity before the mold is closed. Injecting the foamable cushioning material in this manner places less pressure on the upholstery material that forms the cover and results in less stretching or distortion damage to the upholstery material.

Figure 2:
FIG. 2 is an enlarged fragmentary sectional view taken along line 2—2 of FIG. 1 showing the laminate structure according to the invention.

FIG. 2 shows the laminate structure according to the invention. A high density foam 26 is bonded to the interior surface of the fabric cover material 28. Alternatively, the fabric cover material may be a material selected from known upholstery materials, including cloth, vinyl and leather, or a combination of these materials.

Preferably the foam 26 is bonded to the cover material 28 by flame lamination in which the foam is heated to soften and polymerize its outer surface and then that surface is compressed against the fabric cover surface. As the foam cools, the bond between the foam and the fabric is formed. Other suitable bonding techniques may be used.

High density foams useful for the foam 26 of the laminate structure have a density of at least 4 lbs/ft$^3$, preferably in the range of 4 to 15 lbs/ft$^3$, most preferably in the range of 5 to 10 lbs/ft$^3$. The high density foams have an air permeability of from 5 to 100 ft$^3$/ft$^2$ minute, preferably from 5 to 65 ft$^3$/ft$^2$ minute, and most preferably from 5 to 50 ft$^3$/ft$^2$ minute. Air permeability was measured using the procedure set forth in ASTM D 737, in which air is drawn through a foam sample of selected dimension using a Frazier Precision Instrument permeability testing machine. The high density foams have a compression force deflection (25% CFD) of from 1.0 to 8.0 psi, preferably from 1.5 to 8.0 psi, most preferably from 2.0 to 6.0 psi. 25% CFD was measured using the procedure set forth in ASTM D 3574. 25% CFD or "compression force deflection" is a measure of the load-bearing properties of the foam and is calculated by dividing the force required to depress a circular platen into a 2"×2" foam sample to deflect the foam to 25% of its original foam height by the cross-sectional area of the sample. Thus, the units for CFD are pounds per square inch or "psi".

A particularly preferred high density foam is prepared by felting. Felted foams are compressed or densified under heat and pressure to a fraction of their original thickness. For example, a polyurethane foam with a 2.2 lb/ft$^3$ density can be felted to one-fifth of its starting thickness from 15 mm to 3 mm thick (sometimes called "Firmness 5"). The density of such foam after felting was five times its original density or 11 lb/ft$^3$. Typically, to create a felted foam, the foam is compressed for from 10 to 60 minutes and heated to temperatures from 350° F. to 360° F. A compression ratio less than 1 to 2 may not result in a uniform structure, and such felted foam may not be compressed evenly even though it may take a permanent set. Compression ratios preferably exceed from 1 to 2, and range up to from 1 to 20. Greater compression of felted foams is possible.

During the felting process, the cellular polymer strand network is crushed to a more unidirectional state, where the strands are oriented more in parallel. This is sometimes called an anisotropic cell structure. Felted foams generally have lower air permeability than the starting foam prior to felting. This air permeability means that some of the foaming cushioning material will penetrate into the felted foam strand network of the laminate structure during molding, which more evenly distributes the foaming pressure. The air permeability also allows gases produced by the foam-forming reaction to penetrate evenly over the felted foam surface area, rather than concentrating pressure at a single point. Hence, the felted foam barrier is not subject to puncture or to forming pin holes that would concentrate pressure and lead to failure such as occurs with the polyurethane film barriers used in the prior art processes. Nevertheless, as compared to lower density foams, the felted foam with lower air permeability provides a better barrier against strike through.

EXAMPLE

Polyurethane foams are prepared generally by reacting one or more polyols with one or more polyisocyanates in the presence of one or more catalysts, blowing agents, foam stabilizers or surfactants and optionally other foaming aids.

The polyisocyanates include aromatic and aliphatic polyisocyanates each containing at least two isocyanate groups in a molecule, and modified products thereof. Such organic isocyanate compounds include aromatic, aliphatic, and cylcoaliphatic polyisocyanates and combinations thereof. The toluene diisocyanates most suitable for use are 2,4 toluene diisocyanate and 2,6 toluene diisocyanate, and mixtures thereof. Commercially available toluene diisocyanates generally constitute one of the following isomer blends: 80% 2,4 toluene diisocyanate with 20% 2,6 toluene diisocyanate; or 65% 2,4 toluene diisocyanate with 35% 2,6 toluene diisocyanate.

Catalysts include amine catalysts, such as diethylene diamine and triethylene diamine, imidazoles, and tin catalysts, such as stannous octoate. Catalysts are preferably present in amounts from 0.1 to 2.0 parts by weight of amine catalyst and 0 to 2.0 parts by weight of pure tin catalyst, based on 100 parts by weight of the polyol component. Other catalysts may be included in the foam-forming mixture, such as gel catalysts often used as replacements for tin catalysts, including zinc octoate or potassium octoate. Cross-linkers, such as diethanol amine, also may be incorporated into the foam-forming mixture.

Stabilizers include silicone foam stabilizers, and may be present in amounts from 0.1 to 2.0 parts by weight, based on 100 parts by weight of the polyol component.

Water is added as a blowing agent, typically in an amount from 1.0 to 5.0 parts by weight per 100 parts by weight of the polyol component. Water is the preferred blowing agent, but auxiliary blowing agents may be introduced into the foam-forming mixture in some circumstances.

A representative polyurethane foam-forming mixture suitable for preparing a high density foam barrier according to the invention is:

| | | |
|---|---|---|
| 80 Parts | Polyol-SPECFLEX NC 630* (base polyol) | |
| 20 Parts | Polyol-SPECFLEX NH 710* (polyether graft polyol) | |
| 1.4 Parts | Water (blowing agent) | |
| 1.5 Parts | Diethanol Amine (cross-linker) | |
| 0.25 Parts | DABCO 33LV+ (catalyst) | |
| 0.1 Parts | NIAX A-1^ (catalyst) | |
| 1.5 Parts | DC5043+ (silicone surfactant) | |
| 100 index | VORANATE* (toluene diisocyanate) | |

*Dow Chemical
+ Air Products and Chemicals
^ Crompton/Osi

The components are concurrently introduced to a mixing head and mixed together to cause a foaming reaction. Extra air or carbon dioxide may be incorporated into the mixture at the mix head to control the foam cell diameter in the resulting foam. The mixture is then introduced into a mold or onto a moving conveyor as is known in the industry. The foaming mixture is allowed to rise and cure. Thereafter, the foam is cut to a desired thickness before bonding to a cover material. If the density is not sufficiently high for the foam to be used as a barrier foam in the invention, the foam may be felted before it is bonded to a cover material to form a laminate structure for use when making a cushioned component.

The invention has been illustrated by detailed description and examples of the preferred embodiments. Various changes in form and detail will be within the skill of persons skilled in the art. Therefore, the invention must be measured by the claims and not by the description of the examples or the preferred embodiments.

We claim:

1. In a method of making a cushioned component including the steps of (a) providing a cover having an exterior surface which is to present the major exterior appearance of the cushioned component; (b) placing the cover within a mold so that the exterior surface of the cover is facing a mold surface of the mold having a shape corresponding to the desired exterior surface shape of the cushioned component; (c) introducing a foamable material into the mold while the cover is within the mold; and (d) curing the foamable material as said cover is held within the mold, wherein the improvement comprises: (e) laminating a high density foam sheet having a density of at least 4 lbs/ft$^3$ to the interior surface of the material forming the cover prior to placing the cover into the vacuum mold, wherein the high density foam sheet has an air permeability of from 5 to 100 ft$^3$/ft$^2$ minute.

2. The method of claim 1, wherein the high density foam has a density of from 4 lbs/ft$^3$ to 15 lbs/ft$^3$.

3. The method of claim 1, wherein the high density foam has a density of from 5 to 10 lbs/ft$^3$.

4. The method of claim 1, wherein the high density foam is a polyurethane foam.

5. The method of claim 1, wherein the high density foam is created by felting.

6. The method of claim 1, wherein the high density foam has a 25% CFD in the range of 1.0 to 8.0 psi.

7. The method of claim 1, wherein the high density foam has a 25% CFD in the range of 2.0 to 8.0 psi.

8. The method of claim 1, wherein the cushioned component is selected from the group consisting of: seat back, seat cushion, head rest and arm rest.

9. The method of claim 1, further comprising: (f) applying a vacuum to the mold so as to draw the exterior surface of the cover into conformity with the mold surface of the mold having said shape corresponding to the desired exterior surface shape of the cover so that said cover is brought generally into conformity with its desired shape.

10. The method of claim 1, wherein the cover is formed from a material that is perforate between the interior and exterior surfaces thereof.

11. The method of claim 1, wherein the cover is formed from a material selected from the group consisting of: upholstery fabrics, vinyl and leather, and combinations thereof.

12. The method of claim 1, wherein the foamable material is introduced into the mold before the mold is closed.

13. The method of claim 1, wherein the formable material is introduced into the mold after the mold is closed.

* * * * *